US007882336B2

(12) United States Patent
Bohizic et al.

(10) Patent No.: US 7,882,336 B2
(45) Date of Patent: Feb. 1, 2011

(54) EMPLOYING A BUFFER TO FACILITATE INSTRUCTION EXECUTION

(75) Inventors: Theodore J. Bohizic, Hyde Park, NY (US); Mark H. Decker, Rhinebeck, NY (US); Viktor S. Gyuris, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 488 days.

(21) Appl. No.: 11/670,187

(22) Filed: Feb. 1, 2007

(65) Prior Publication Data

US 2008/0189527 A1    Aug. 7, 2008

(51) Int. Cl.
*G06F 7/38* (2006.01)
(52) U.S. Cl. .................................................. 712/226
(58) Field of Classification Search .................. 712/220
See application file for complete search history.

(56) References Cited

U.S. PATENT DOCUMENTS

| 4,591,982 A * | 5/1986 | Buonomo et al. ........... 712/203 |
|---|---|---|
| 5,515,521 A * | 5/1996 | Whitted et al. ................. 711/3 |
| 5,586,278 A | 12/1996 | Papworth et al. ............ 395/582 |
| 5,918,046 A | 6/1999 | Hoyt et al. ................... 395/586 |
| 6,249,861 B1 * | 6/2001 | Tremblay et al. ............ 712/204 |
| 2003/0093649 A1 | 5/2003 | Hilton .......................... 712/41 |
| 2005/0132338 A1 | 6/2005 | Kalra .......................... 717/129 |
| 2006/0004997 A1 * | 1/2006 | Mykland ..................... 712/244 |
| 2006/0259736 A1 | 11/2006 | Carver et al. ................ 711/220 |
| 2008/0168260 A1 * | 7/2008 | Zyuban et al. .............. 712/214 |

FOREIGN PATENT DOCUMENTS

WO    WO 98/59292    12/1998

OTHER PUBLICATIONS

"The VAX 8800 Microarchitecture," Sudhin Mishra, Computer Society International Conference, Digent of Papers, Spring, San Francisco, Feb. 23-27, 1987; Washington, IEEE Comp. Soc. Press, US, vol. Conf. 32, Feb. 23, 1987, pp. 322-327.
PCT Notification of Transmittal of the International Search Report and the Written Opinion of the International Searching Authority, or the Declaration; PCT/EP2008/050652, May 20, 2008.

* cited by examiner

*Primary Examiner*—Eddie P Chan
*Assistant Examiner*—John Lindlof
(74) *Attorney, Agent, or Firm*—John E. Campbell; Blanche E. Schiller, Esq.; Heslin Rothenberg, Farley & Mesiti P.C.

(57) ABSTRACT

Instruction execution is facilitated by employing a buffer to handle instructions having special circumstances. When such an instruction is to be executed, a pointer of the instruction is directed to the buffer. The instruction is executed from the buffer and then the pointer is recovered to point to a location other than the buffer.

20 Claims, 7 Drawing Sheets

EMPLOYING A BUFFER TO FACILITATE INSTRUCTION EXECUTION

TECHNICAL FIELD

This invention relates, in general, to processing instructions within a processing environment, and in particular, to employing buffers to facilitate instruction execution.

BACKGROUND OF THE INVENTION

Typically, during execution of an instruction stream, an instruction is executed, a plurality of tests are performed, and then a next instruction is executed, etc. Certain instructions, however, require special handling. For instance, an execute instruction specifies a target instruction that can be modified prior to execution. This modification is to be managed. Further, an instruction that is crossing a memory boundary (e.g., a page boundary) requires that physically discontiguous portions of the instruction be obtained. Again, this situation is to be managed.

The handling of these circumstances is important. However, the handling of these circumstances during mainline processing degrades system performance.

SUMMARY OF THE INVENTION

Based on the foregoing, a need exists for a capability that handles the special circumstances external to mainline processing. In particular, a need exists for a capability that facilitates instruction execution. In one example, buffers are used to facilitate instruction execution, such that the special circumstances are handled external to mainline processing. When an instruction with special circumstances is observed, a pointer of the instruction points to a temporary buffer which at the very least has a copy of that instruction. The instruction is executed from the temporary buffer and then the pointer is recovered to point to the appropriate location in memory.

The shortcomings of the prior art are overcome and additional advantages are provided through the provision of an article of manufacture that includes at least one computer usable medium having computer readable program code logic to facilitate instruction execution in a processing environment. The computer readable program code logic when executing performing, for instance, the following: providing a buffer with an instruction; determining whether an aspect of the instruction in the buffer is to be modified; modifying the aspect, in response to the determining indicating the aspect is to be modified; and redirecting an instruction pointer to the buffer in order to enable execution of the instruction from the buffer, instead of execution of the instruction in memory.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided to control instruction execution in a processing environment. As one example, instructions within a mainline instruction stream continue to be processed, in response to passing a single test. However, if the test fails, then a test set is executed, rather than an instruction in the mainline stream.

The single test includes a comparison of an instruction counter to a variable, referred to herein as end-of-range, which is selectively set to a value. While that value is not met, instruction execution continues to proceed to the next instruction in the mainline instruction stream. However, upon reaching or exceeding the value, execution falls through to a predetermined test set, which is then executed.

In one embodiment, during processing of a test set, a buffer may be employed to facilitate instruction execution. For instance, certain instructions require special handling when being processed (e.g., Execute instructions, and instructions crossing page boundaries). To facilitate this handling, a buffer is used in which the target instruction is copied enabling modifications to be made to the instruction, if necessary or desired.

Figure 1:
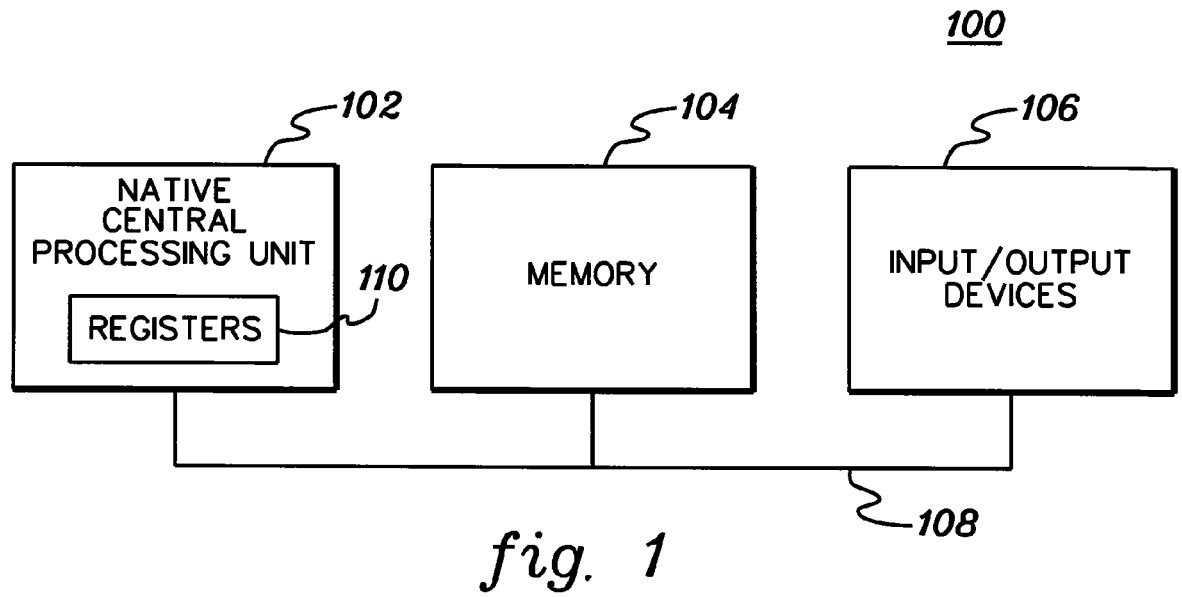
FIG. 1 depicts one embodiment of a processing environment to incorporate and use one or more aspects of the present invention.

One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety.

Processing environment 100 includes, for instance, a native processor 102 (e.g., a central processing unit (CPU)), a memory 104 (e.g., main memory) and one or more input/output (I/O) devices 106 coupled to one another via, for example, one or more buses 108. As examples, processor 102 is a part of a pSeries® server offered by International Business Machines Corporation (IBM®), Armonk, N.Y. IBM®, pSeries® Power PC®, and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

To provide emulation, the processing environment is architected to include an emulator, a guest operating system and one or more guest applications. These architected features are further described with reference to FIG. 2.

Figure 2:
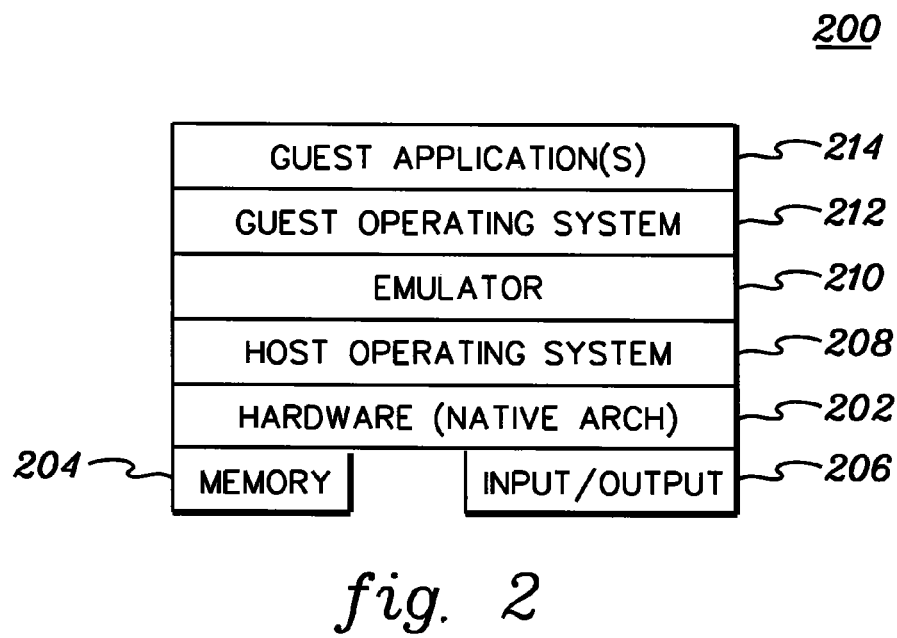
FIG. 2 depicts one embodiment of a system architecture of the processing environment of FIG. 1, in accordance with an aspect of the present invention.

Referring to FIG. 2, one embodiment of a system architecture 200 of processing environment 100 is described. System architecture 200 includes, for instance, a plurality of implementation layers, which define the architected aspects of the environment. In this particular example, the layers include hardware 202, which is coupled to memory 204 and input/output devices and/or networks 206 via one or more interfaces and/or controllers; a host operating system 208; an emulator 210; a guest operating system 212; and one or more guest applications 214; as examples. One layer is coupled to at least one other layer via one or more interfaces. For instance, guest applications 214 are coupled to guest operating system 212 via at least one interface. Other interfaces are used to couple the other layers. Moreover, the architecture can also include other layers and/or interfaces. Various of the layers depicted in FIG. 2 are further described below.

Hardware 200 is the native architecture of the processing environment and is based on, for instance, Power4, PowerPC®, Intel®, or other architectures. Running on the hardware is a host operating system 202, such as AIX® offered by International Business Machines Corporation, or LINUX. AIX® is a registered trademark of International Business Machines Corporation, Armonk, N.Y.

Emulator 210 includes a number of components used to emulate an architecture that differs from the native architecture. In this embodiment, the architecture being emulated is the z/Architecture® offered by International Business Machines Corporation, but other architectures may be emulated as well. The emulation enables a guest operating system 212 (e.g., z/OS®, a registered trademark of International Business Machines Corporation) to execute on the native architecture and enables the support of one or more guest applications 214 (e.g., Z applications). Further details regarding emulator 210 are described with reference to FIG. 3.

Figure 3:
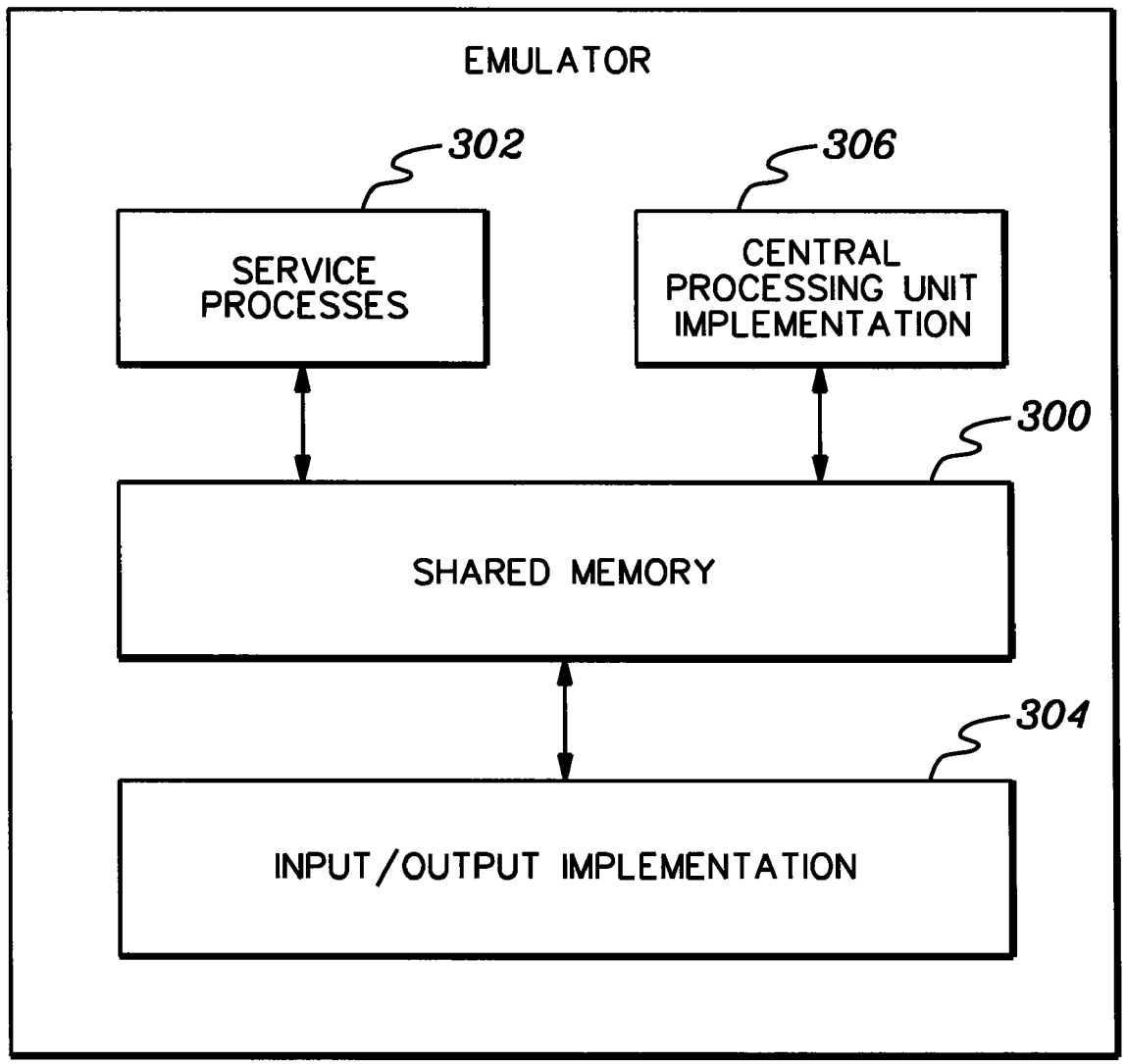
FIG. 3 depicts further details of one embodiment of an emulator of the system architecture of FIG. 2, in accordance with an aspect of the present invention.

Referring to FIG. 3, emulator 210 includes a shared memory 300 coupled to one or more service processes 302, an input/output (I/O) implementation 304, and a central processing unit (CPU) implementation 306, each of which is described in further detail below.

Shared memory 300 is a representation of a portion of memory in the host that is visible from service processes 302, I/O implementation 304, and CPU implementation 306. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 302 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 304 includes, for instance, one or more subchannel processes and an I/O controller used to communicate with I/O devices. The I/O controller is responsible for starting the subchannel processes and performing recovery, in one aspect of the present invention.

Central processing unit (CPU) implementation 306 is responsible for executing instructions and managing the processing. It includes a number of components, which are described with reference to FIGS. 4A-4B.

Figure 4A:
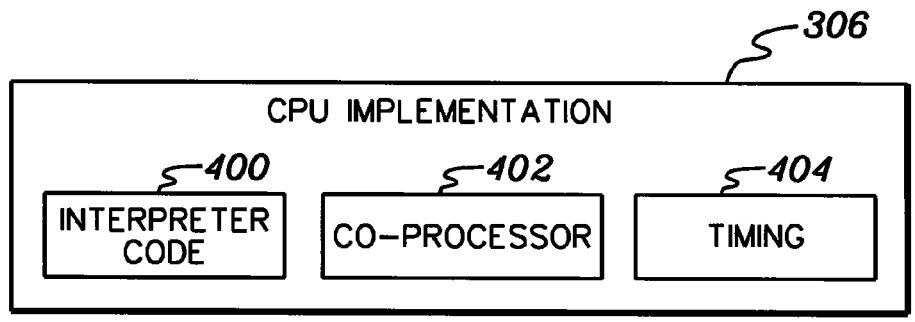
FIG. 4A depicts further details of one embodiment of a central processing unit (CPU) implementation of the emulator of FIG. 3, in accordance with an aspect of the present invention.
Figure 4B:
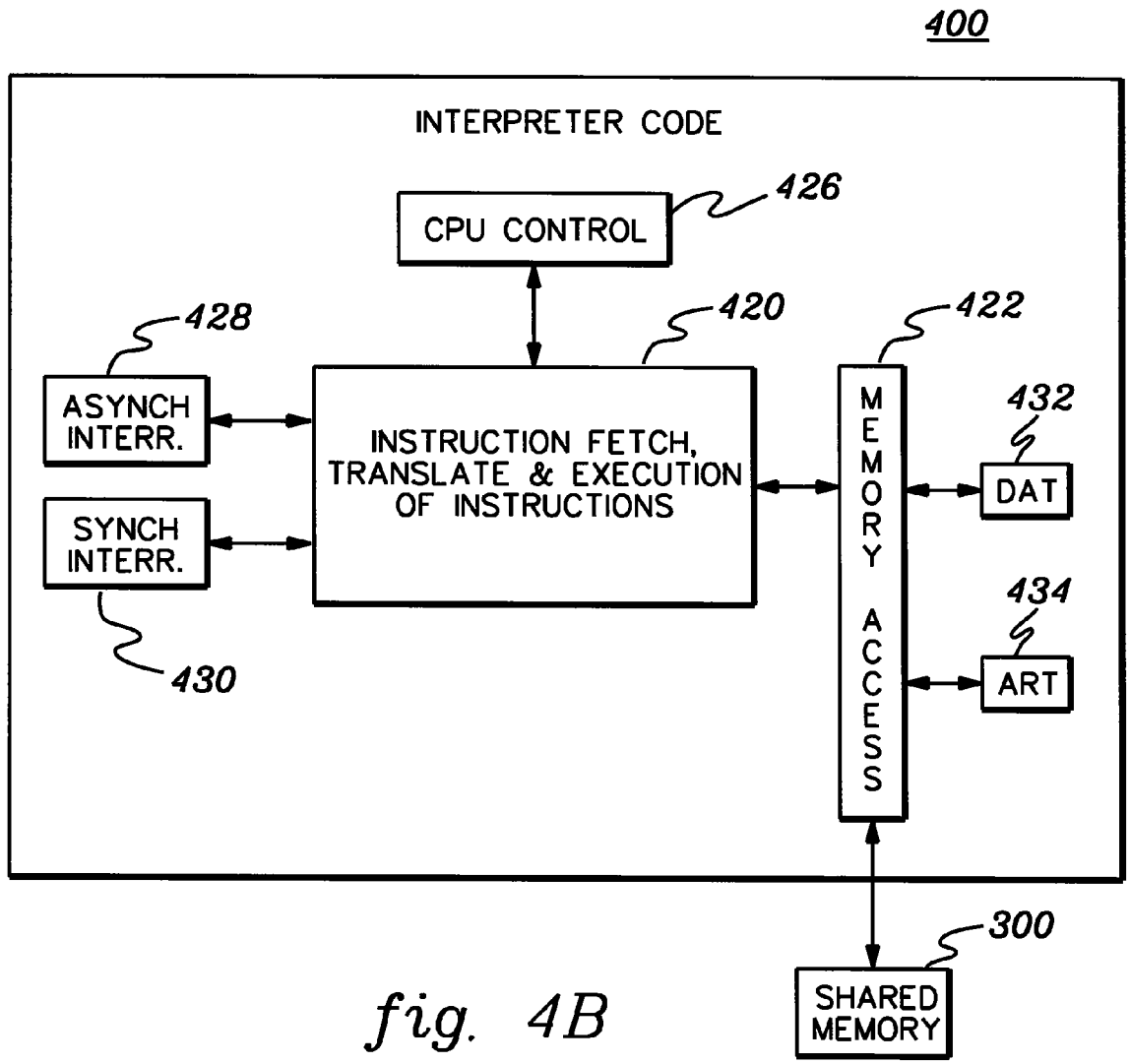
FIG. 4B depicts further details of one embodiment of interpreter code of the CPU implementation of FIG. 4A, in accordance with an aspect of the present invention.

Referring to FIG. 4A, CPU implementation 306 includes, for instance, interpreter code 400 used to obtain, translate and execute instructions; an architectured co-processor 402 that aids in initial start-up and communication with the chip (e.g., Service Call Logical Processor (SCLP) processes); and timing facilities 404 that are responsible for timing functions of the emulator. Further details regarding interpreter code 400 are described with reference to FIG. 4B.

Interpreter code 400 includes, for instance, an interpretation unit 420 coupled to a memory access unit 422, a CPU control 426, an asynchronous interruption handler 428 and a synchronous interruption handler 430.

Interpretation unit 420 is responsible for obtaining one or more guest instructions from memory, providing native instructions for the guest instructions, and executing the native instructions. The guest instructions comprise software instructions (e.g., machine instructions) that were developed to be executed in an architecture other than that of native CPU 102. For example, the guest instructions may have been designed to execute on a z/Architecture® processor, but are instead being emulated on native CPU 102, which may be, for instance, a pSeries® server.

In one example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

In a further example, the providing includes creating during, for instance, a translation process, a native stream of instructions for a given guest instruction. This includes identifying the function and creating the equivalent native instructions.

If an instruction includes a memory access, then memory access routines 422 are used to access shared memory 300. The memory access routines may use translation mechanisms, such as dynamic address translation (DAT) 432 or access register translation (ART) 434, to translate a logical address to an absolute address, which is then used to access the memory or may be further translated, if needed.

In this embodiment, the processing within interpretation unit 420 is to be streamlined. Thus, if a more complicated circumstance arises, such as a wait state, or changing from one architecture level to another architecture level (e.g., z/Architecture® to ESA/390), etc., control is transferred to CPU control 426, which handles the event and then returns control to interpretation unit 420.

Moreover, if an interrupt occurs, then processing transitions from interpretation unit 420 to either asynchronous interruption handler 428, if it is an asynchronous interruption, or synchronous interruption handler 430, if it is a synchronous interruption. After the interrupt is handled, processing returns to interpretation unit 420.

In particular, the interpretation unit monitors certain locations in shared memory and if a location has changed, it signifies an interrupt has been set by one of the CPUs or I/O. Thus, the interpretation unit calls the appropriate interruption handler.

Figure 5:
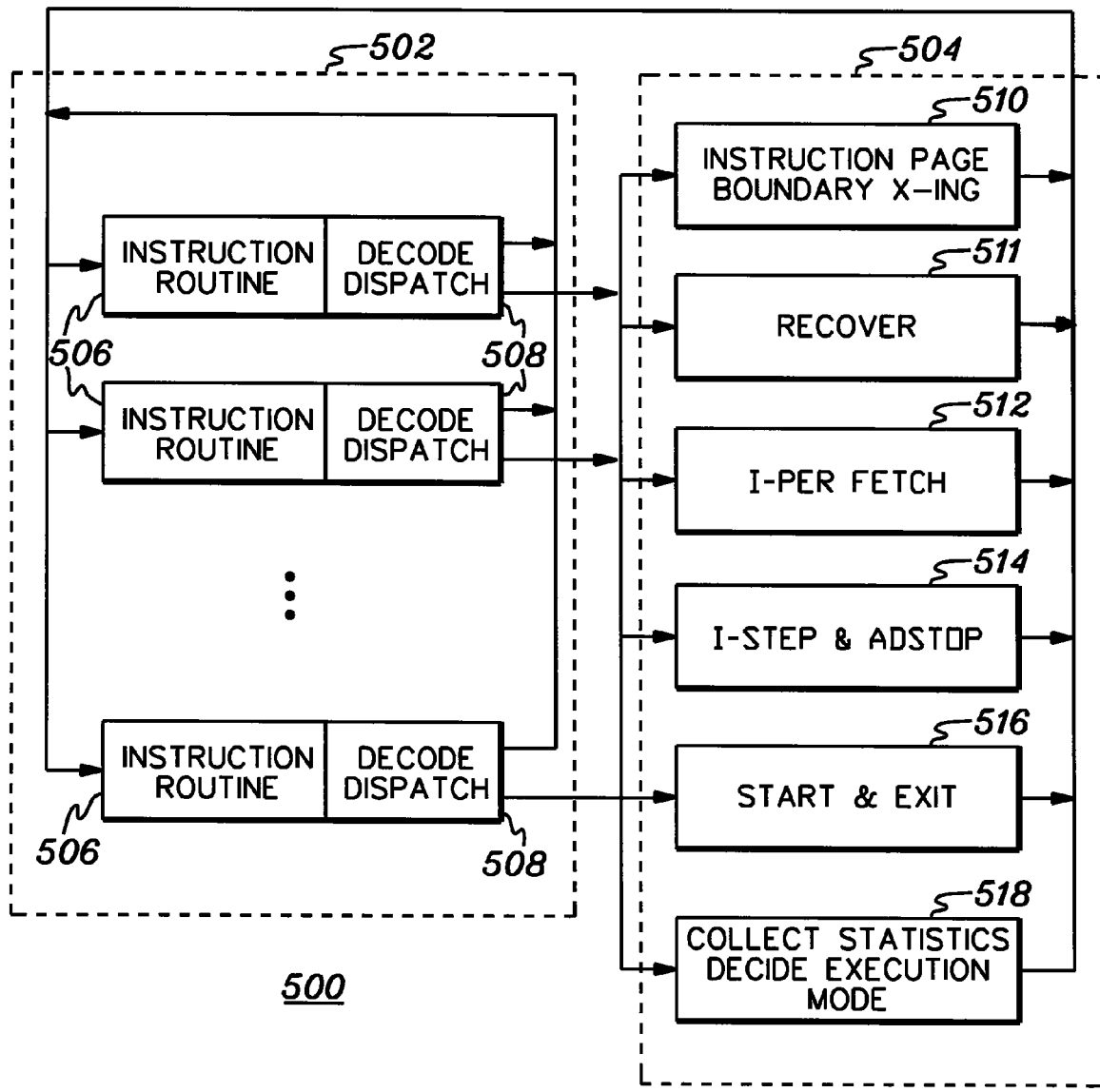
FIG. 5 depicts one embodiment of a flow of instruction execution, in accordance with an aspect of the present invention.

Further details regarding interpretation unit 420 are described with reference to FIG. 5. In particular, FIG. 5 depicts one embodiment of a processing flow associated with the interpretation unit. In this embodiment, the processing flow is considered threaded, since each instruction routine has an associated decode/dispatch routine (i.e., no central control). This flow is executing instructions that are emulating the z/Architecture®, in one embodiment.

With reference to FIG. 5, it is shown that a processing flow 500 includes two sections, one referred to herein as the mainline processing 502 and the other which is referred to as test set processing 504. The mainline processing is streamlined processing in which processing proceeds from one instruction routine to another instruction routine without performing significant tests between instructions. In this embodiment, the only test performed between instruction execution is a simple test that determines whether mainline processing is to continue or whether processing is to fall through to the test sets. If further testing is to be performed or other action is required, then processing exits the mainline processing and enters test set processing 504. Once the tests or other processing are performed, then processing resumes in mainline processing. It is expected that a vast majority of the time, processing will remain in mainline processing.

In one embodiment, prior to entering mainline processing, certain initialization is performed. For instance, a pointer is input to interpretation unit 420 (FIG. 4*b*), which indicates a particular file or memory area that includes the instruction stream to be executed. This instruction stream includes, for instance, Z instructions to be executed on the native processor.

In addition to providing a pointer to the instruction stream, an instruction counter for the instruction stream is provided, as well as state associated with the processing environment being emulated (e.g., Z state). The state includes various registers and flags that indicate, for instance, whether instruction program event recording (I-PER) mode is active, whether I-STEP or ADSTOP is active, the current execution mode, etc. The state is evaluated and based on that evaluation, one of the test sets of test set processing 504 (FIG. 5) is selected. For instance, if I-PER mode is active, a PER test set may be selected. A pointer is set to the selected test set and processing continues at that test set.

The selected test set is performed, which may include performing one or more tests and/or one or more actions, as described below. In the test set, a decision is made as to which test set is to be selected next, if processing falls through mainline processing again. Further, a variable, end-of range, is set which is used in the single test to determine if mainline processing is to continue. This variable is set based on the testing being performed and the processing stage of the instruction stream, as described in further detail below.

Subsequent to performing the test set, processing continues to an instruction routine 506 of the mainline processing, which is determined by the test set. When that selected instruction routine is completed, control continues at a decode/dispatch routine 508 associated with the selected instruction routine 506.

The decode/dispatch routine reads the instruction stream for a next opcode and proceeds to that instruction or falls through to a test set. For example, in the decode/dispatch routine, a single test is performed to determine whether streamlined mainline processing continues or whether processing temporarily falls through to the test set processing. That is, at the decode/dispatch point, a test is made to determine whether more complex processing is needed or whether processing can remain in the main inline stream. If more complex processing is required, then the circumstances surrounding the instruction are artificially modified in a predetermined test set to make them simple before advancing to an instruction routine, since the instruction routine assumes the situation is simple. For instance, the instruction stream assumes it can fetch an instruction from physically contiguous locations. If decode/dispatch indicates that it cannot because the instruction crosses a page boundary, then processing continues to a test set in which additional processing is performed.

There are various test sets that can be selected for processing including, for instance, Instruction Page Boundary Crossing 510, Recover 511, I-PER Fetch 512, I-Step and Adstop 514, Start and Exit 516, and Collect Statistics Decide Execution Mode (JIT mode) 518. Although these test sets are provided as examples, additional, less or different test sets may be employed. Each test set can include one or more actions to be performed prior to returning to the mainline processing. Further details regarding the test sets are described below.

One test set that can be selected is the Instruction Page Boundary Crossing test set 510, which is used to determine whether an instruction is crossing a page boundary. This test set is invoked when an instruction is close to the end of a page (or other designated unit of memory). For instance, the end-of-range variable is set to, for instance, a value that equals end of page minus 4 bytes. In the decode/dispatch routine associated with the instruction routine that just completed, the end-of-range value is compared to the instruction counter to determine whether the instruction is close to end of page. If this single test is satisfied, test set 510, in this example, is invoked.

In test set 510, a test is performed to determine whether the instruction spans more than one page. As an example, if the page still has 4 bytes and an instruction is only 2 bytes, then it still fits on the page. Thus, processing resumes in mainline processing, which executes the instruction. However, if the instruction is 6 bytes and only 4 bytes of the instruction are on the one page, then it is determined that the instruction is crossing a page boundary. Since the last 2 bytes of the instruction are logically contiguous, but physically discontiguous, processing is performed in order to obtain the last 2 bytes and provide the 6 bytes, as if they were physically contiguous. The 6 bytes are obtained, as if they were in physical contiguous memory, and are provided to the appropriate instruction routine (via a pointer) to be executed.

As described above, instead of performing the page boundary crossing test within each instruction in mainline processing, this test is only performed when desired or necessary. That is, it is only performed when it is determined that the instruction is close to the end of a page.

Another test set is the Recover test set 511. This test set is invoked when special handling for an instruction is needed, as described in further detail below. In one example, values of various variables are stored, and those variables are subsequently changed. Recover is then used to return those variables to the saved values.

Another test set is the I-PER Fetch test set 512. PER monitoring is a z/Architected debugging tool that monitors certain program events, such as fetching an instruction from a designated storage area. This test set is employed when the end-of-range value indicates I-PER mode is to begin. For instance, if PER monitoring is to begin in a middle of the page, and a comparison of the end-of-range variable and the instruction counter indicates the middle of the page and PER monitoring is to begin, this test set is invoked and processing associated with PER is performed.

Another test set is the I-Step and Adstop test set 514. The I-Step and Adstop are debugging tools in the architected z/Architecture®. For I-Step, the processor is placed in a mode in which it steps through a single instruction and then goes into a halt state. During the halt state, the state of the machine is examined. For instance, the registers are manually read, and thereafter, a continue I-Step mode is issued. For the I-Step test set to be invoked, the end-of-range variable coincides with the instruction counter. After executing any kind of instruction, the instruction counter will be over the end of range immediately, thus, the end-of-range is artificially set to zero. Thus, the program execution goes to the test block immediately after each instruction. It will go to a halt state, wait for user interaction, and then continue.

Adstop is a stop when the instruction address is within a particular range. It is similar to PER mode.

Another test set is the Start and Exit test set. This test set is used when control is to be transferred to CPU control and back. When program execution changes from one architecture mode to another, then this flow is exited and control continues with the CPU control. To invoke this test set, the end-of-range variable is set to zero, as an example.

The Collect Statistics/Decide Execution Mode test set 518 is used to determine which mode is to be used for execution. This test set collects usage statistics and chooses an execution mode based on the statistics. Examples of execution modes include interpretative mode (return to mainline processing 502); recording mode in which each executed instruction is copied to a buffer; and translation mode, which is used when the addresses have been previously translated. To invoke this test set, the end-of-range variable is set to zero, as an example. This allows this test set to be processed after each instruction.

Although in the above test sets, a primary test or action is indicated, each test set may include other actions. For instance, each test set may also check, for instance, whether an instruction page boundary crossing is being crossed or whether an interrupt is pending, in addition to the primary test or action. Many other examples also exist.

Figure 6:
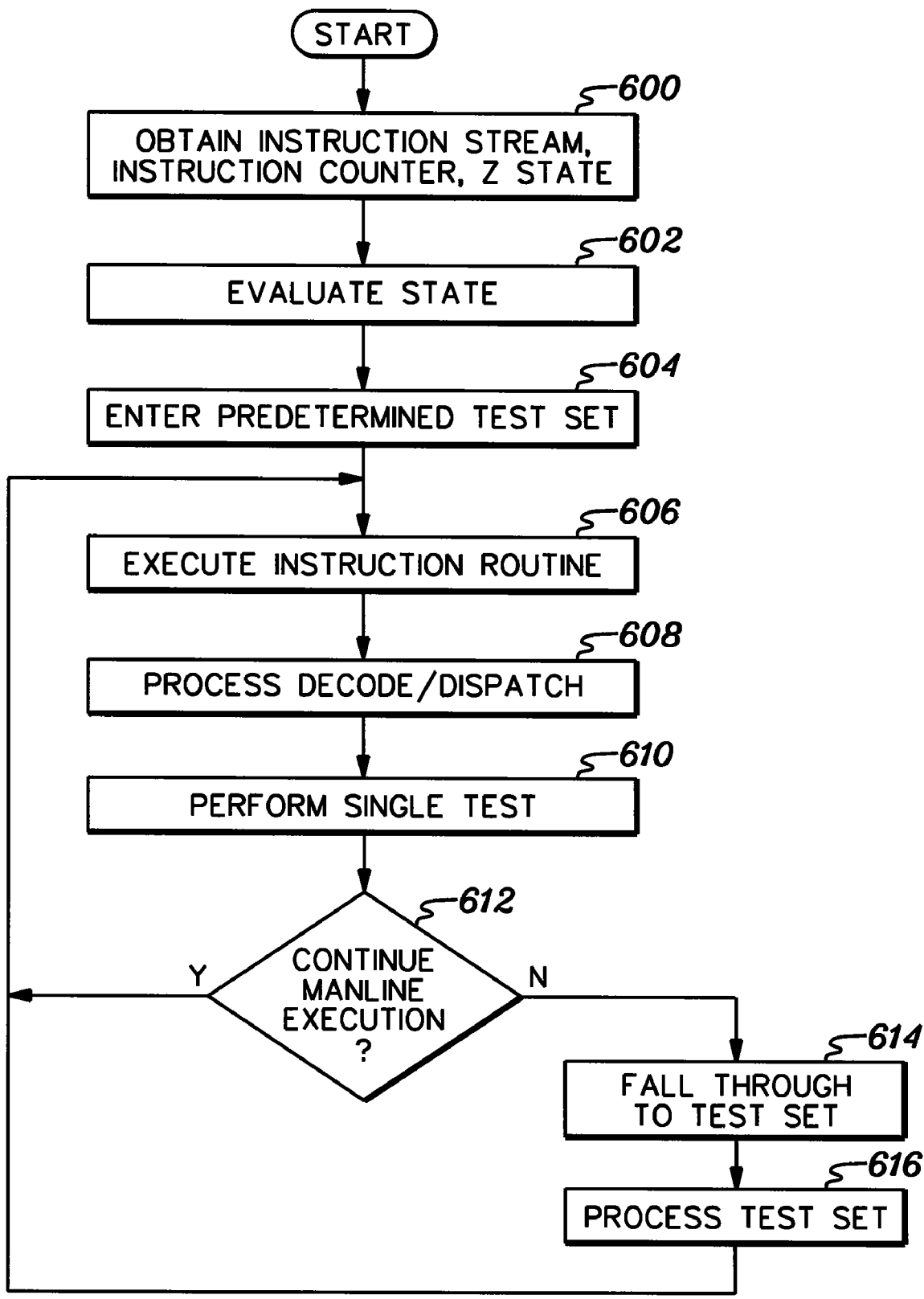
FIG. 6 depicts one embodiment of the logic associated with executing an instruction stream, in accordance with an aspect of the present invention.

Further details associated with processing an instruction stream by interpreter 420 are described with reference to FIG. 6.

Initially, a pointer to an instruction stream is input to interpreter 420, along with an instruction counter and state associated with the instruction stream, STEP 600. The state includes, for instance, registers, including, floating point, general, control and/or addressing registers, as examples, and flags indicating for instance, PER mode active, I-Step active, etc. This state is evaluated, STEP 602.

Based on the evaluation, one of the test sets is selected and processing of that test set commences, STEP 604. This test set is predetermined in that the evaluation indicates that processing is to commence with a particular test set. In the test set, certain actions are performed depending on the test set. Additionally, the test set determines the next test set to be invoked, if needed, and sets a test set pointer to point to that next test set. The next test set can be the same test set or a different test set depending on the evaluation performed within the test set (e.g., PER active, close to a page boundary crossing, I-Step active, etc.)

In response to executing the test set, flow proceeds to a selected instruction routine in the mainline processing, and that routine is executed, STEP 606. In one example, the routine includes one instruction; although, in other examples, it can include a plurality of instructions. When the instruction routine completes, processing continues with the decode/dispatch routine associated with the instruction routine, STEP 608. At decode/dispatch, the single test is performed to determine whether processing is to continue to the next instruction or fall through to a test set, STEP 610. This single test is a check as to whether the value of end-of-range has been met. If it has not been met, INQUIRY 612, then processing continues with mainline execution, STEP 606. Otherwise, processing falls through to the predetermined test set, STEP 614, and the test set is processed, STEP 616. Processing then continues with the next instruction routine to be processed, as indicated by the test set.

Additional details relating to processing the test set are described with reference to FIG. 7. During processing of a test set, an instruction may be executed that includes special handling. To facilitate handling such an instruction, a buffer is employed, as described below.

Figure 7:
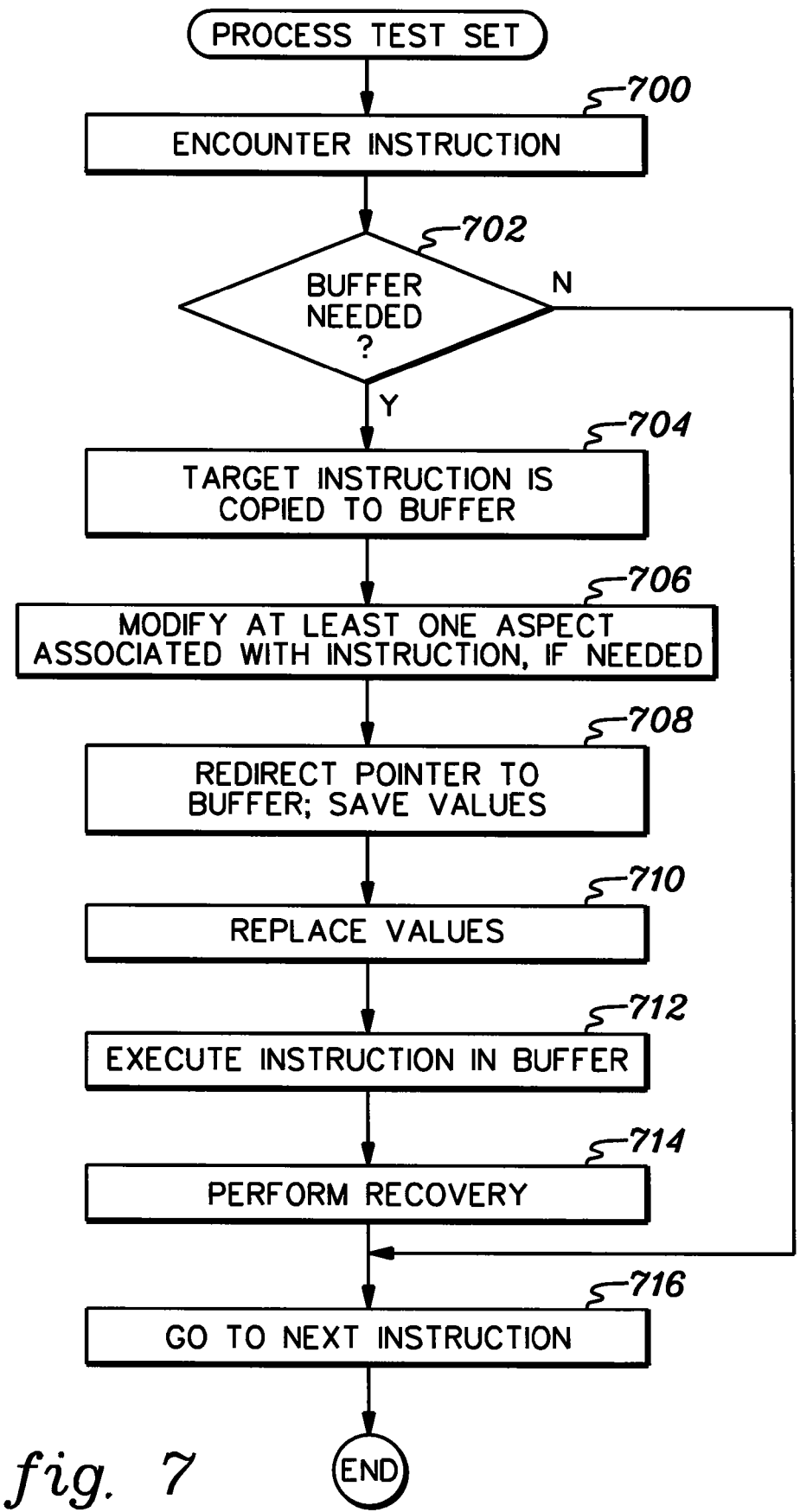
FIG. 7 depicts one embodiment of the logic associated with processing a test set of FIG. 6, in accordance with an aspect of the present invention.

Referring to FIG. 7, processing of a test set commences and an instruction is encountered, STEP 700. A determination is made as to whether this instruction is of the type that requires special handling, INQUIRY 702. For instance, a check is made as to whether the instruction is an execute instruction or an instruction crossing a page boundary. If it is an instruction that requires special handling, then the buffer is employed. This buffer is a temporary buffer residing in local memory of the processor. For instance, if the instruction is an execute instruction, which is a Z instruction that specifies a target instruction to be performed, the target instruction is loaded into the buffered memory location, STEP 704. By copying the target instruction to the buffer, at least one aspect associated with the instruction can be modified, STEP 706. For example, assume that the target instruction is a move character (MVC) instruction and the number of bytes to be moved, as specified in the instruction, is to be modified. The instruction is copied to the buffer and is modified to indicate the number of bytes to be moved. For instance, if the original number of bytes to be moved is 4 bytes, this can be changed to another value, such as 8 bytes. Thus, instead of moving the 4 bytes, the target instruction is modified to move 8 bytes (or any other number of bytes).

As a further example, assume the instruction is an instruction crossing a page boundary. In this case, the target instruction is the instruction to be executed, and the logically contiguous, but physically non-contiguous, bytes of the instruction are copied to the buffer to make them physically contiguous. For instance, a first set of bytes of the instruction located on one page is copied to the buffer and the remaining bytes of the instruction on another page are also copied to the buffer, STEP 704. In this example, the instruction need not be modified, and thus, STEP 706, is ignored.

Subsequent to initializing the buffer, various tasks are performed as part of the test set being processed. These tasks include, for instance, redirecting the instruction pointer to the buffer and saving values of various variables for later use, STEP 708. For instance, the current value of the end-of-range variable is saved, as well as the current value of the next test set indicator.

Thereafter, the values of these variables are replaced, STEP 710. For instance, end-of-range is set to zero, and the next test set indicator is set to point to the recovery test set.

The instruction in the buffer is then executed. At decode/dispatch, the single test (e.g., end-of-variable) fails, so the recovery test set is selected, STEP 714. During recovery, the actions at STEPs 708-710 are undone. For instance, the instruction pointer is redirected to the original instruction stream; the end-of-range variable is set to its saved value; and the next test set indicator is also reset to its saved value. Processing then continues at the next instruction, STEP 716.

Returning to INQUIRY 702, if the instruction is not of the type requiring special handling, then processing continues with the next instruction of the test set or back in mainline processing, as directed by the test set.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
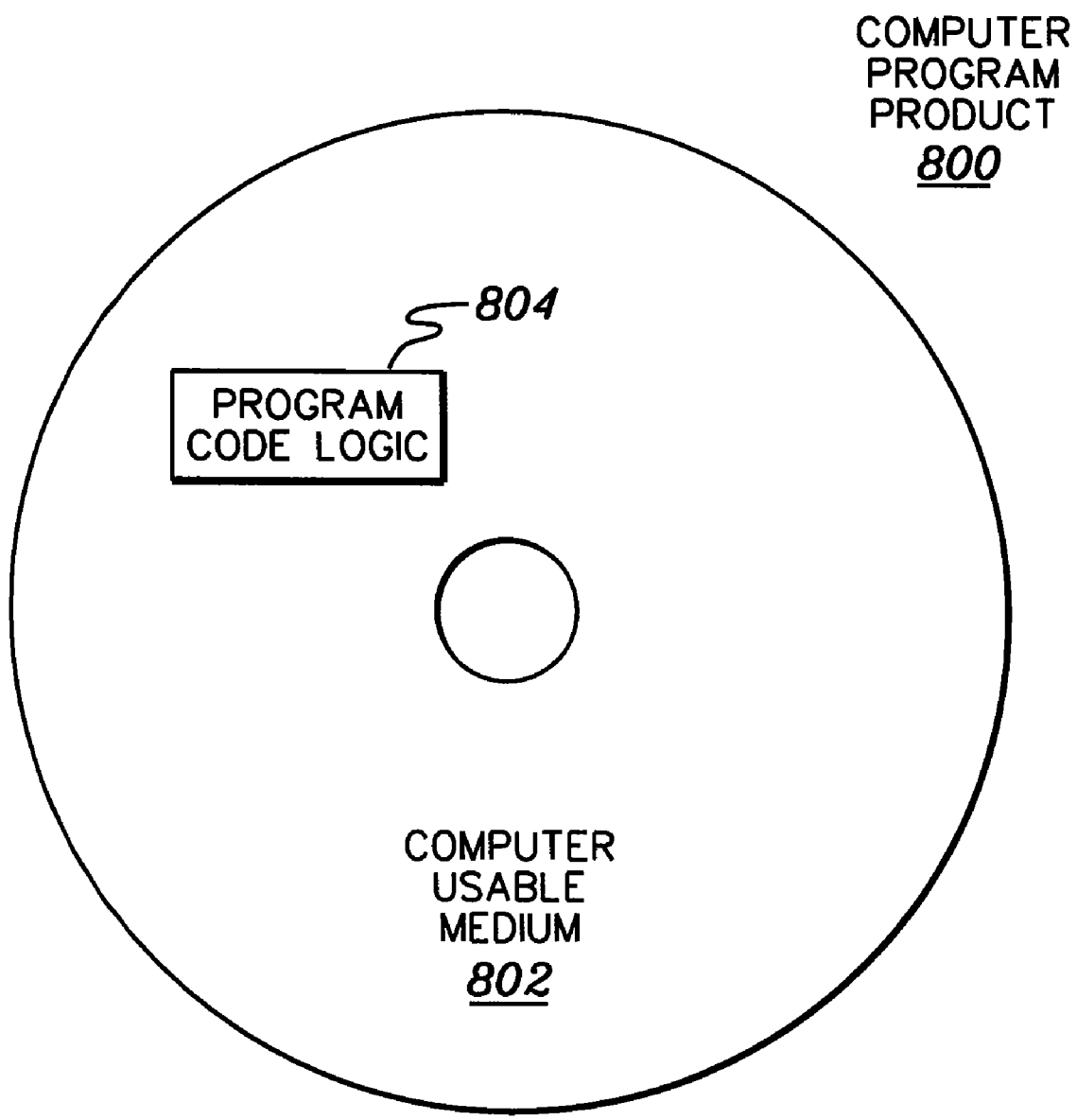
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability for controlling instruction execution is provided, in which control is maintained within mainline processing, unless testing (other than the single end-of-range test) or other actions are required, as determined by the single end-of-range test. By performing the tests only when needed, performance is enhanced and coding is simplified (e.g., each instruction need not include the code for all of the tests).

Advantageously, processing is streamlined in that branching occurs to the next routine (assuming a test set need not be processed), instead of back to the interpreter and then to the next routine.

As a further advantage, overhead associated with certain instructions, such as execute instructions, is reduced by using the buffer. With an execute instruction, there is overhead associated with jumping from one page of memory to another page of memory. For example, the execute instruction, which is on one page of memory, is executed, and then the target instruction, which is on a different page of memory, is executed. After the target instruction is executed, processing returns to the instruction after the execute instruction. There is overhead associated with this branching back and forth. However, by using the buffer, a record is maintained of leaving the first page, so when processing returns, recovery can be performed and additional testing and/or actions (e.g., address translation, etc.) need not be performed.

Although various embodiments are described above, these are only examples. For instance, the processing environment can include processing units that are based on architectures other than Power4, PowerPC® or Intel®. Additionally, servers other than pSeries® servers can incorporate and use one or more aspects of the present invention. Moreover, operating systems other than those mentioned herein can be used. Further, the processing environment can emulate environments other than the z/Architecture®. Additionally, various emulators can be used. Emulators are commercially available and offered by various companies. Yet further, the processing environment need not include emulator code. Many other types of processing environments can incorporate and/or use one or more aspects of the present invention.

Additionally, although a buffer is employed in processing certain instructions, such as execute instructions and instructions crossing page boundaries, there may be other instructions and/or situations in which the buffer is to be used, and these are included within the scope of the present invention.

Further, although test sets have been provided as examples. Additional, less and/or other test sets may be employed. The number of test sets included is design dependent. Many variations to the present invention are possible and are included within the scope of the present invention.

Moreover, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention these are therefore considered to be within the scope of the invention as defined in the following claims.

What is claimed is:

1. A computer program product for facilitating instruction execution in a processing environment, the computer program product comprising:
   a storage medium readable by a processor and storing instructions for execution by the processor for performing a method comprising:
   processing an instruction stream, the processing comprising:
      executing an instruction routine of the instruction stream;
      performing, in response to executing the instruction routine, a test to determine whether processing is to continue to another instruction routine of the instruction stream or fall through mainline processing of the instruction stream to a test set;
      responsive to determining that processing is to fall through to the test set, executing the test set to determine whether to redirect an instruction pointer from an instruction to be executed of the instruction stream to a target instruction in a buffer, wherein executing the test set comprises:
         determining that the instruction to be executed is to be handled differently than one or more other instructions of the instruction stream;
         providing, with reference to the instruction to be executed, a target instruction in a buffer located in memory, in response to the determining indicating that the instruction to be executed is to be handled differently;
         determining whether an aspect of the target instruction in the buffer is to be modified;
         modifying the aspect, in response to the determining indicating the aspect is to be modified; and
         redirecting the instruction pointer from the instruction to be executed to the target instruction in the buffer, wherein the target instruction in the buffer is to be executed.

2. The computer program product of claim 1, wherein the providing the target instruction in the buffer comprises copying the instruction to be executed from a logically contiguous but physically discontiguous location in memory to a physically contiguous location in the buffer.

3. The computer program product of claim 1, wherein the instruction to be executed comprises an instruction crossing a page boundary, and the providing the target instruction in the buffer comprises copying a first part of the instruction to be executed from one page of memory to the buffer and a second part of the instruction to be executed from another page of memory to the buffer.

4. The computer program product of claim 1, wherein the instruction to be executed comprises an execute instruction, the target instruction in the buffer being a target instruction of the execute instruction, and wherein the modifying comprises modifying a register of the target instruction in the buffer.

5. The computer program product of claim 4, wherein the target instruction of the execute instruction comprises a move character instruction, and the register is modified to indicate a desired number of bytes to be moved, said modifying overriding an initial value specified in the move character instruction.

6. The computer program product of claim 1, wherein the method further comprises:
   executing the target instruction in the buffer; and
   determining at which memory location processing is to continue.

7. The computer program product of claim 6, wherein the determining at which memory location processing is to continue comprises:
   selecting a next test set to be performed, the next test set providing processing external to mainline processing of the instruction stream comprising the instruction to be executed; and
   indicating that the next test set is to be executed next.

8. The computer program product of claim 7, wherein the next test set is a recovery test set used to redirect the instruction pointer to the instruction stream that includes the instruction to be executed.

9. The computer program product of claim 1, wherein the processing environment comprises an emulator.

10. The computer program product of claim 1, wherein, in response to the redirecting, the instruction in the buffer is executed, instead of executing the instruction to be executed as originally indicated in the instruction stream, and wherein performing the test comprises using a single test, wherein the single test uses a variable that is dynamically set based on a processing stage of the instruction stream and testing performed in response to the execution of a previous test set for the instruction stream, and wherein the single test comprises comparing an instruction counter of the instruction routine to the value of the variable.

11. A method of facilitating instruction execution in a processing environment, said method comprising:
   processing an instruction stream, the processing comprising:
      executing an instruction routine of the instruction stream;
      performing, in response to executing the instruction routine, a test to determine whether processing is to continue to another instruction routine of the instruction stream or fall through mainline processing of the instruction stream to a test set;
      responsive to determining that processing is to fall through to the test set, executing the test set to determine whether to redirect an instruction pointer from an instruction to be executed of the instruction stream to a target instruction in a buffer, wherein executing the test set comprises:
         determining that the instruction to be executed is to be handled differently than one or more other instructions of the instruction stream;
         providing, with reference to the instruction to be executed, a target instruction in a buffer located in memory, in response to the determining indicating that the instruction to be executed is to be handled differently;
         determining whether an aspect of the target instruction in the buffer is to be modified;
         modifying the aspect, in response to the determining indicating the aspect is to be modified; and
         redirecting the instruction pointer from the instruction to be executed to the target instruction in the buffer, wherein the target instruction in the buffer is to be executed.

12. The method of claim 11, wherein the providing the target instruction in the buffer comprises copying the instruction to be executed from a logically contiguous but physically discontiguous location in memory to a physically contiguous location in the buffer.

13. The method of claim 11, wherein the instruction to be executed comprises an instruction crossing a page boundary, and the providing the target instruction in the buffer comprises copying a first part of the instruction to be executed from one page of memory to the buffer and a second part of the instruction to be executed from another page of memory to the buffer.

14. The method of claim 11, wherein the instruction to be executed comprises an execute instruction, the target instruction in the buffer being a target instruction of the execute instruction, and wherein the modifying comprises modifying a register of the target instruction in the buffer.

15. The method of claim 11, wherein the processing environment comprises an emulator.

16. A computer system for facilitating instruction execution in a processing environment, said computer system comprising:

a memory; and a processor in communications with the memory, wherein the computer system is configured to perform a method, said method comprising:

processing an instruction stream, the processing comprising:

executing an instruction routine of the instruction stream;

performing, in response to executing the instruction routine, a test to determine whether processing is to continue to another instruction routine of the instruction stream or fall through mainline processing of the instruction stream to a test set;

responsive to determining that processing is to fall through to the test set, executing the test set to determine whether to redirect an instruction pointer from an instruction to be executed of the instruction stream to a target instruction in a buffer, wherein the executing the test set comprises:

determining that the instruction to be executed is to be handled differently than one or more other instructions of the instruction stream;

providing, with reference to the instruction to be executed, a target instruction in a buffer located in memory, in response to the determining indicating that the instruction to be executed is to be handled differently;

determining whether an aspect of the target instruction in the buffer is to be modified;

modifying the aspect, in response to the determining indicating the aspect is to be modified; and redirecting the instruction pointer from the instruction to be executed to the target instruction in the buffer, wherein the target instruction in the buffer is to be executed.

17. The computer system of claim 16, wherein the providing the target instruction in the buffer comprises copying one portion of the instruction to be executed and another portion of the instruction to be executed to the buffer from physically discontiguous but logically contiguous locations in memory.

18. The computer system of claim 16, wherein the instruction to be executed comprises an instruction crossing a page boundary, and the providing the target instruction in the buffer comprises copying a first part of the instruction to be executed from one page of memory to the buffer and a second part of the instruction to be executed from another page of memory to the buffer.

19. The computer system of claim 16, wherein the instruction to be executed comprises an execute instruction, the target instruction in the buffer being a target instruction of the execute instruction, and wherein the modifying comprises modifying a register of the target instruction in the buffer.

20. The computer system of claim 16, wherein the processing environment comprises an emulator.

* * * * *